United States Patent [19]

Park

[11] Patent Number: 6,081,891
[45] Date of Patent: Jun. 27, 2000

[54] VIDEO BIOS LOADING APPARATUS AND A CONTROL METHOD THEREOF

[75] Inventor: Seung-Ho Park, Suwon, Rep. of Korea

[73] Assignee: SamSung Electronics Co., Ltd., Suwon, Rep. of Korea

[21] Appl. No.: 09/061,894

[22] Filed: Apr. 17, 1998

[30] Foreign Application Priority Data

Apr. 18, 1997 [KR] Rep. of Korea ............ 97-14558

[51] Int. Cl.[7] .................................................. G06F 9/445
[52] U.S. Cl. ........................ 713/2; 710/10; 710/104
[58] Field of Search .................... 345/11, 122; 710/2, 710/8–14, 101–104; 713/1–2, 100

[56] References Cited

U.S. PATENT DOCUMENTS

| | | | |
|---|---|---|---|
| 5,448,045 | 9/1995 | Clark | 235/382 |
| 5,481,754 | 1/1996 | Piazza | 710/3 |
| 5,598,531 | 1/1997 | Hill . | |
| 5,600,801 | 2/1997 | Parks et al. | 710/102 |
| 5,752,032 | 5/1998 | Keller et al. | 709/302 |
| 5,799,204 | 8/1998 | Pesto, Jr. | 710/10 |
| 5,835,766 | 11/1998 | Harmer | 713/2 |
| 5,864,698 | 1/1999 | Krau et al. | 713/2 |
| 5,908,888 | 5/1999 | Jones et al. | 713/2 |
| 5,915,265 | 6/1999 | Crocker et al. | 711/170 |
| 5,922,655 | 7/1999 | Shahar et al. | 710/16 |
| 5,926,166 | 7/1999 | Khederzadeh et al. | 345/132 |
| 5,930,564 | 7/1999 | Gabel | 713/2 |
| 5,943,029 | 8/1999 | Ross | 345/11 |

Primary Examiner—Christopher B. Shin
Attorney, Agent, or Firm—Robert E. Bushnell, Esq.

[57] ABSTRACT

A video BIOS loading apparatus and a control method thereof which eliminates the need of manually resetting a jumper when replacing an existing video card with a new video card. The video BOIS loading apparatus includes a read only memory (ROM) having a video BIOS stored therein; an expansion unit for engaging a video card thereon, the video card having a video card BIOS; and a central processing unit (CPU) for selecting and using a more suitable BIOS between the video BIOS and the video card BIOS for the video card.

20 Claims, 7 Drawing Sheets

VIDEO BIOS LOADING APPARATUS AND A CONTROL METHOD THEREOF

CLAIM OF PRIORITY

This application makes reference to, incorporates the same herein, and claims all benefits accruing under 35 U.S.C §119 from an application entitled A Video Bios Loading Apparatus And A Control Method Thereof earlier filed in the Korean Industrial Property Office on Apr. 18, 1998, and there duly assigned Serial No. 97-14558 by that Office.

BACKGROUND OF THE INVENTION

1. Field of the Invention

The present invention relates to a video BIOS (Basic Input Output System) loading apparatus and a control method thereof and, more particularly, to a video BIOS loading apparatus and a control method thereof which automatic upgrades a video BIOS for a video card and eliminates the inconvenience of manually upgrading the video BIOS when replacing an existing video card.

2. Description of the Related Art

A video BIOS is a set of instructions used by a central processing unit (CPU) of a computer system for operating a video card. In general, a video BIOS in a personal computer system is included in a system BIOS stored in a read only memory (ROM) as described in U.S. Pat. No. 5,481,754 to William J. Piazza and entitled Apparatus And Method For BIOS Interface To Features In Multiple Adapter Cards In One Operation Using Registers With Bits Distributed Across The Adapter Cards and U.S. Pat. No. 5,072,411 to Kazunori Yamaki and entitled Computer System Which Can Operate In A Plurality Of Display Modes.

An exemplary video BIOS loading apparatus is explained below by referring to FIGS. 6 and 7. The exemplary video BIOS loading apparatus loads a video BIOS stored in a read only memory (ROM) to a random access memory (RAM) in order to facilitate efficient access of the video BIOS by a CPU. FIG. 6 shows a schematic diagram of an exemplary video BIOS loading apparatus. FIG. 7 is a flow chart of operation of the exemplary video BIOS loading apparatus in FIG. 6.

As shown in FIG. 6, the exemplary video BIOS loading apparatus includes a CPU 300, a RAM 310, a ROM 320 having a system BIOS and a video BIOS, a video controller 330, a system bus 340, a peripheral device 350, an expansion slot 360 whereon a video card 370 may be engaged, and a jumper 380.

Operation of the exemplary video BIOS loading apparatus is explained below referring to FIG. 7. The exemplary video BIOS loading apparatus begins operation when the power is turned on. CPU 300 reads the system BIOS stored in ROM 320. CPU 300 then checks jumper 380, at step S71, to determine, at step S72, whether a video card BIOS in video card 370 is to be loaded in RAM 310. If jumper 380 has been set to load the video card BIOS, then it is loaded to RAM 310 at step S73. If jumper 380 has not been set to load the video card BIOS, then the video BIOS stored in ROM 320 is loaded in RAM 310 at step S84.

A user may wish to replace an existing video card with an upgraded video card manufactured by the same company or with a video card that is manufactured by a different company. In such cases, the user may also need to reset the computer system so that the CPU would use a more suitable video BIOS for the replaced video card. That is, if the user replaces the existing video card with an upgraded video card thereof, it is preferable to use an upgraded video BIOS therefor. If the user replaces the existing video card with a different company's video card, it is preferable to use a video BIOS made by that company than the existing video BIOS.

Under a conventional video BIOS loading apparatus, a user has to manually change the jumper's setting in order to reset a computer system to use an upgraded video BIOS or a different video BIOS when he replaces an existing video card with an upgraded video card of the same company or a video card of different company. This is inconvenient since such procedure takes a considerable time and since typical users possesses little technical expertise in computer hardware and would have difficulty resetting the computer system by themselves.

In addition to the inconvenience described above, the conventional video BIOS loading apparatus requires a video BIOS to be stored in a ROM even when a video card BIOS in a video card is used in place of the video BIOS, which is a waste of valuable memory space of a ROM and results in an increase in production costs of a computer system.

SUMMARY OF THE INVENTION

A primary object of the present invention is to solve the problems associated with conventional art.

It is another object of the present invention to provide an improved video BIOS loading apparatus for loading and upgrading a BIOS of a video card used by a computer system.

It is still another object of the present invention to provide a video BIOS loading apparatus which eliminates the inconvenience of manually resetting a jumper when a user replaces an existing video card with a new video card for the computer system.

A video BIOS loading apparatus constructed as an embodiment of the present invention includes a read only memory (ROM) having a video BIOS stored therein; an engaging means for engaging a video card, the video card having a video card BIOS; and a controller which compares the video BIOS stored in the ROM and the video card BIOS stored in the video card, and uses a more suitable BIOS between the video BIOS and the video card BIOS for the video card.

According to another aspect of the present invention, a video BIOS loading apparatus includes a ROM having a video BIOS stored therein; an engaging means; a video card engaged in the engaging means; and a controller which uses a video card BIOS if the video card has the video card BIOS or uses the video BIOS stored in the ROM if the video card does not have a video card BIOS.

According to another aspect of the present invention, a video BIOS loading apparatus includes an engaging means; a video card having a video card controller and a video card BIOS, the video card engaged to the engaging means; and a controller which controls the video card controller and uses the video card BIOS for operating the video card.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings, in which like reference symbols indicate the same or similar components, wherein.

DETAILED DESCRIPTION OF THE PREFERRED EMBODIMENTS

Figure 1:
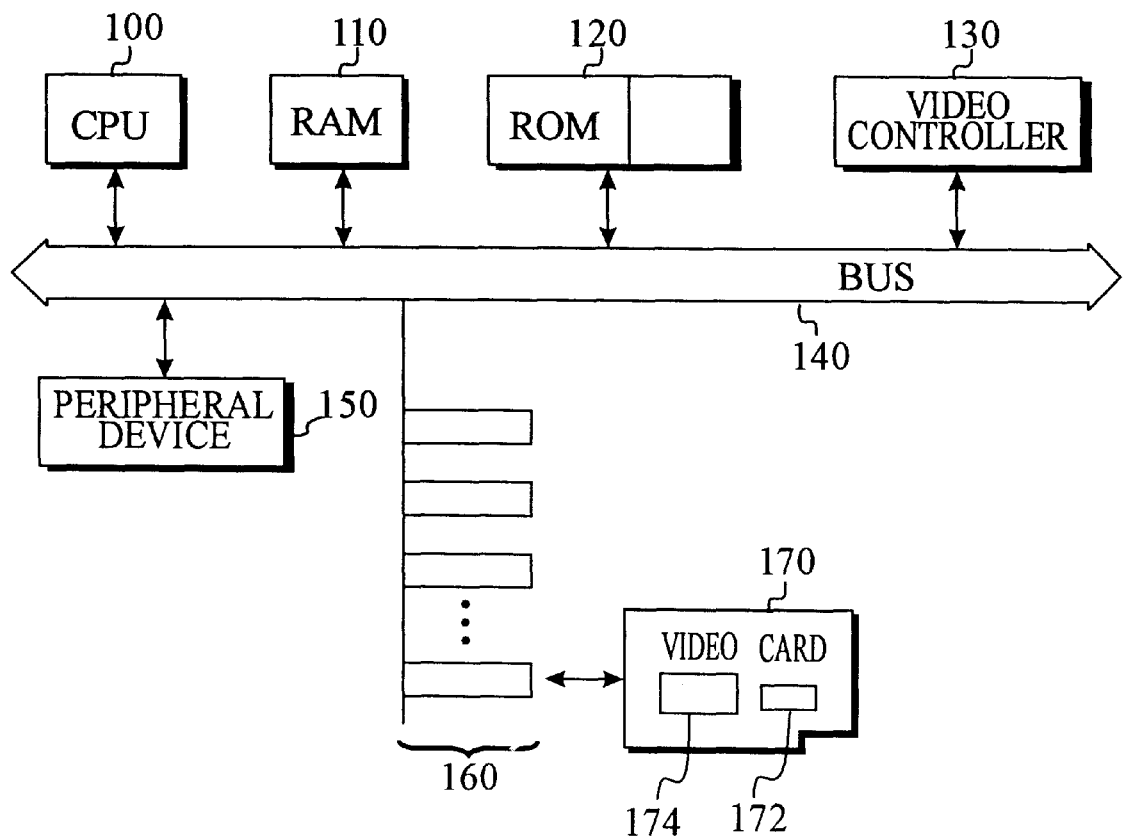
FIG. 1 is a schematic diagram of a video BIOS loading apparatus according to an embodiment of the present invention.

Turning now to the drawing, FIG. 1 is a schematic diagram of a video BIOS loading apparatus for a computer system according to a first embodiment of the present invention. The video BIOS loading apparatus includes a central processing unit (CPU) 100, a random access memory (RAM) 110, a read only memory (ROM) 120 having a system BIOS and a video BIOS, and a video controller 130, a system bus 140, a peripheral device 150, and an expansion slot 160. It is also possible to store the video BIOS within the system BIOS.

CPU 100, RAM 110, ROM 120, and video controller 130 are provided on a printed circuit board and are connected to each other and to peripheral device 150 and expansion slot 160 via system bus 140. A video card 170 may be inserted in expansion slot 160.

Figure 2:
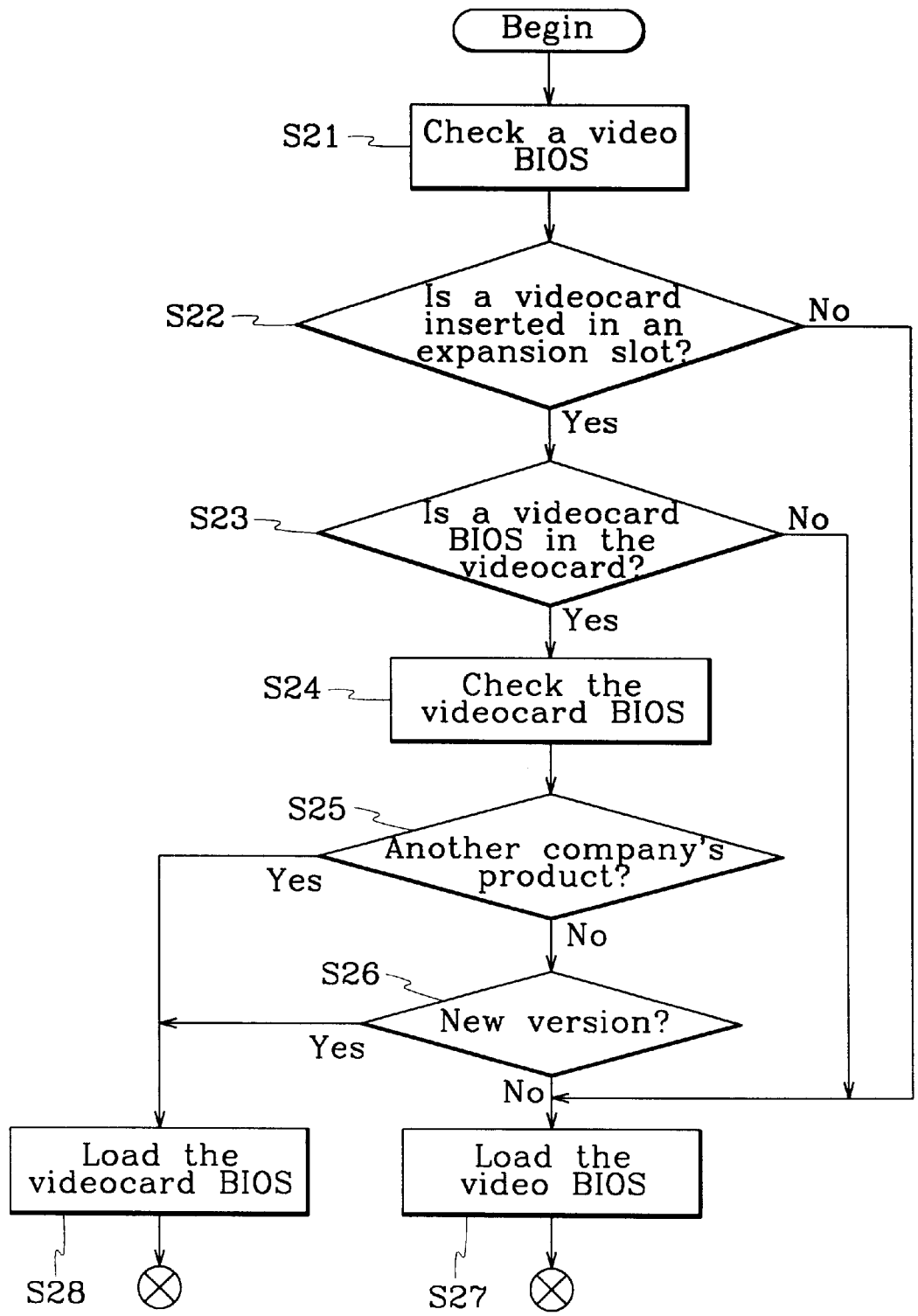
FIG. 2 is a flow chart of an operation of the video BIOS loading apparatus according to FIG. 1.

The operation of the video BIOS loading apparatus according to the first embodiment of the present invention is described below referring to FIGS. 1 and 2. The video BIOS loading apparatus according to the present invention commences operation when a user turns on the power. The system BIOS stored in ROM 120 is read into CPU 100. CPU 100 checks the video BIOS also stored in ROM 120 (S21). CPU 100 then determines whether an option card, e.g., video card 170, is engaged in expansion slot 160 (S22). If video card 170 is not engaged in expansion slot 160, CPU 100 controls video controller 130 and loads the video BIOS stored in ROM 120 to RAM 110 via system bus 140 (S27).

If video card 170 is engaged in expansion slot 160, CPU 100 determines if video card 170 includes a video card BIOS 172 (S23). If video card BIOS 172 is not included in video card 170, CPU 100 controls video controller 130 and loads video BIOS stored in ROM 120 to RAM 110 via system bus 140 (S27).

If video card BIOS 172 exists, CPU 100 reads an identification code of video card BIOS 172 (S24) and determines whether or not video card 170 is another company's product (S25). In addition to the above method, determination of whether or not video card 170 is another company's product may be done by using methods other than the one described above for purposes of working the present invention.

If video card 170 is determined to be another company's product, CPU 100 controls a video card controller 174 on video card 170 and loads video card BIOS 172 to RAM 110 via system bus 140 (S28). On the other hand, if video card 170 is determined to be the same company's product, CPU 100 checks the version of video card BIOS 172 and determines whether it is a more recent version than the video BIOS stored in ROM 120 (S26).

If video card BIOS 172 is a more recent version, CPU 100 controls video card controller 174 and loads video card BIOS 172 to RAM 110 via system bus 140(S28). If video card BIOS 172 is not a more recent version, CPU 100 controls video controller 130 and loads the video BIOS stored in ROM 120 to RAM 110 via system bus 130 (S27).

Figure 3:
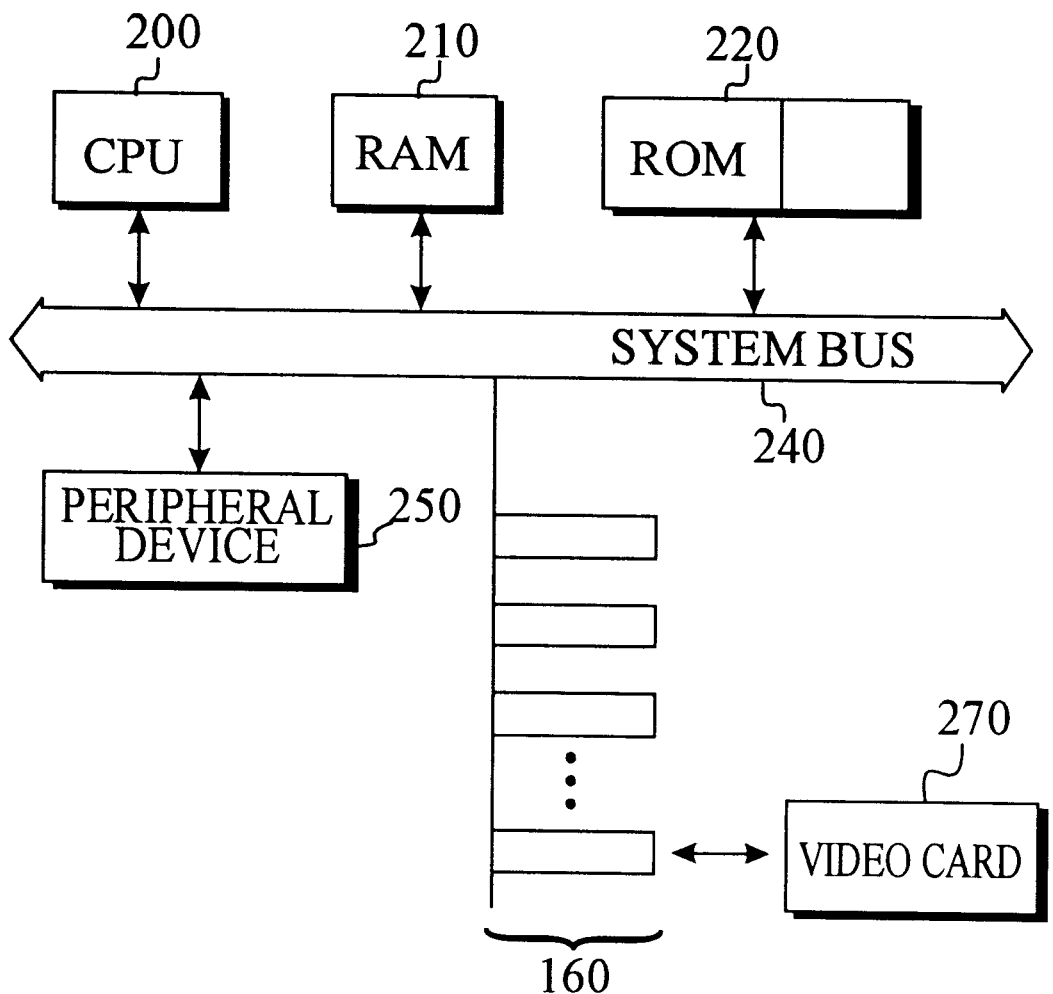
FIG. 3 is a schematic diagram of a video BIOS loading apparatus according to another embodiment of the present invention.

FIG. 3 shows schematic diagram of a video BIOS loading apparatus according to a second embodiment of the present invention. The second embodiment is a simplification of the first embodiment, in that the video controller 130 of the first embodiment is not used in the second embodiment. The video BIOS loading apparatus includes a central processing unit (CPU) 200, a random access memory (RAM) 210, a read only memory (ROM) 220, a system bus 240, a peripheral device 250, and an expansion slot 260. CPU 200, RAM 210, and ROM 220 are provided on a printed circuit board. They are connected to each other and to peripheral device 250 and expansion slot 260 via system bus 240. A video card 270 including a video card controller (not shown) and may include a video card BIOS (not shown) may be engaged in expansion slot 260.

Figure 4:
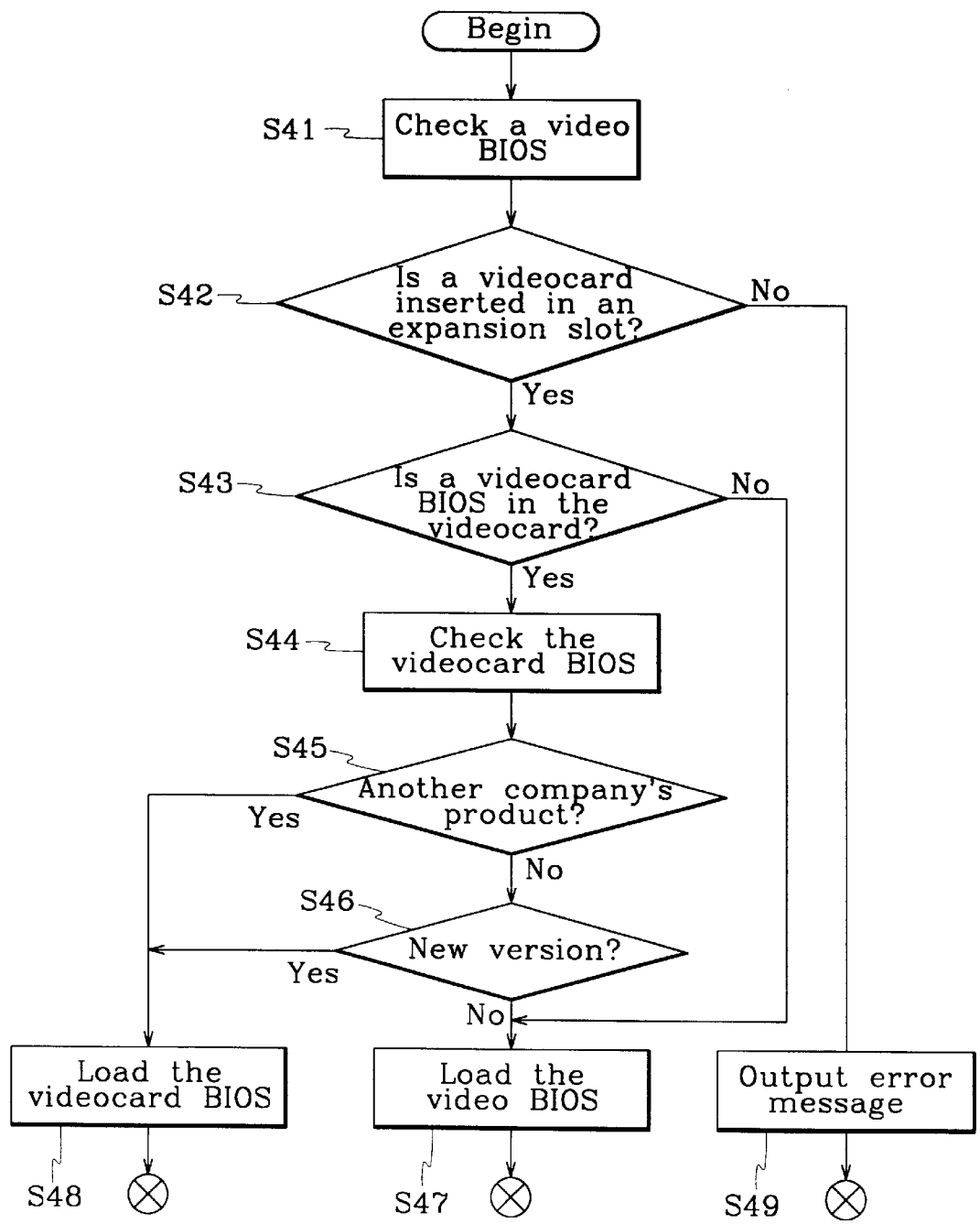
FIG. 4 is a flow chart of an operation of the video BIOS loading apparatus according to FIG. 3.

The operation of the second embodiment above is explained below by referring to FIGS. 3 and 4. The video BIOS loading apparatus according to the second embodiment of the present invention begins operation when a user turns on the power. A system BIOS stored in ROM 220 is read into CPU 200. CPU 200 checks a video BIOS also stored in ROM 220 (S41).

CPU 100 then determines whether an option card, e.g., video card 270, is engaged in expansion slot 260 (S42). If the video card 270 is not engaged in the expansion slot 260, an error message is output (S49) for display on a cathode ray tube, for example.

If video card 270 is engaged in expansion slot 260, CPU 200 determines if video card 270 includes the video card BIOS (S43). If the video card BIOS is not included in video card 270, CPU 200 controls the video card controller in video card 270 and loads the video BIOS stored in ROM 220 to RAM 210 via system bus 240 (S47). If the video card BIOS exists, CPU 200 reads an identification code of the video card BIOS (S44) and determines whether or not video card 270 is another company's product (S45). In addition to the above method, determination of whether or not video card 270 is another company's product may be done using methods other than one described here for purposes of the present invention.

If the video card 270 is determined to be another company's product, CPU 200 controls the video card controller on video card 270 and loads the video card BIOS to RAM 210 via system bus 240 (S48). On the other hand, if video card 270 is determined to be the same company's product, CPU 200 checks the version of the video card BIOS and determines whether it is a more recent version than the video BIOS stored in ROM 220 (S46).

If the video card BIOS is a more recent version, CPU 200 controls the video card controller on video card 270 and loads the video card BIOS to RAM 210 via system bus 240 (S48). If the video card BIOS is not a more recent version, CPU controls the video card controller on video card 270 and loads the video BIOS stored in ROM 220 to RAM 210 via system bus 130 (S47).

Figure 5:
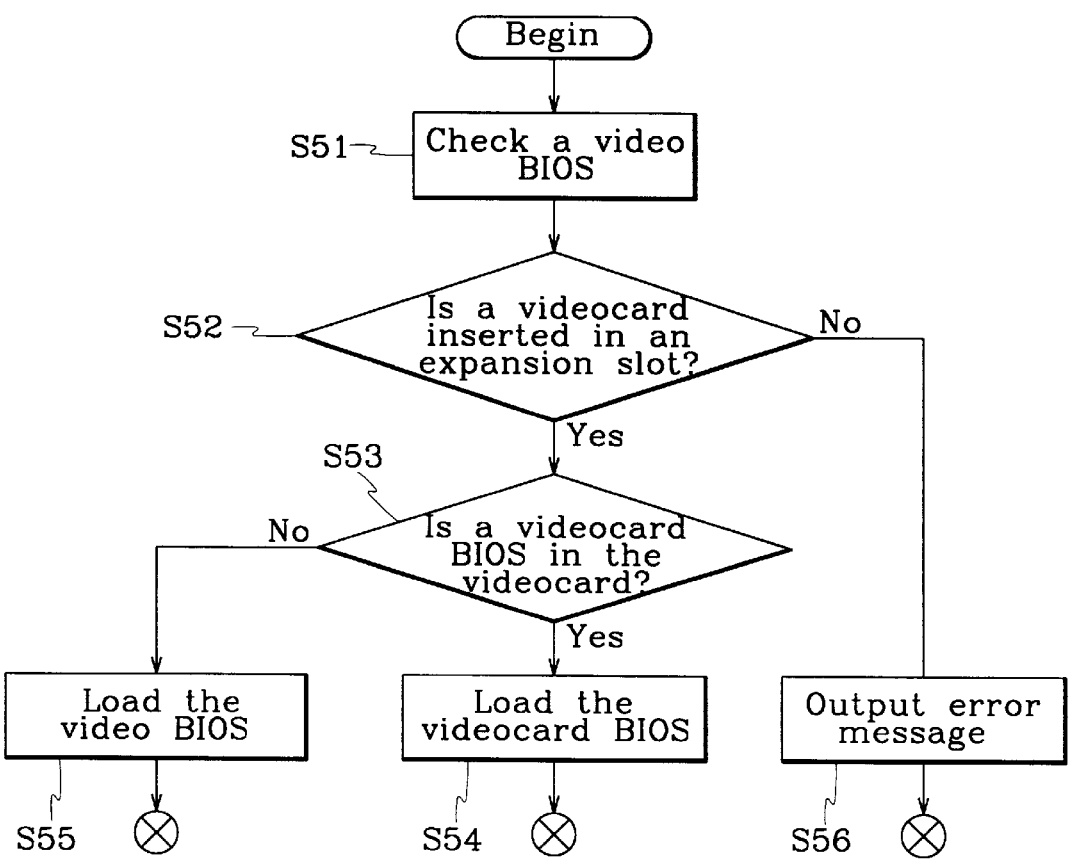
FIG. 5 is a flow chart of another operation of the video BIOS loading apparatus according to FIG. 3.
Figure 6:
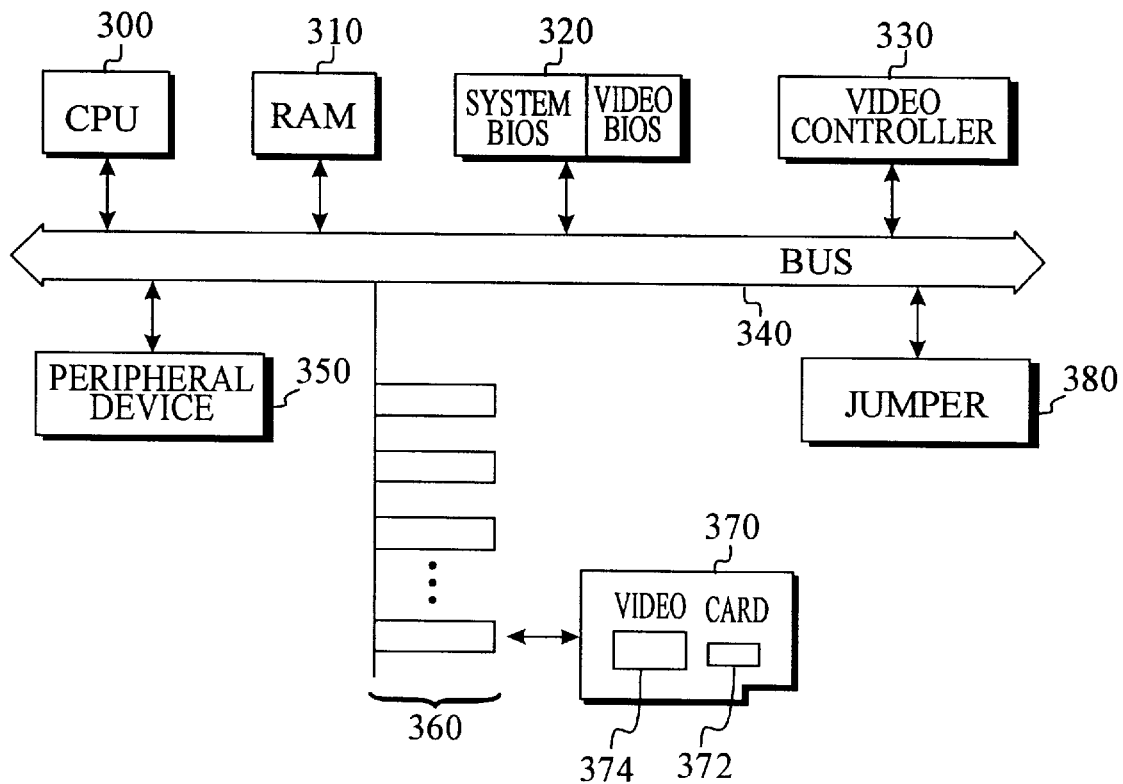
FIG. 6 is a schematic diagram of an exemplary video BIOS loading apparatus.
Figure 7:
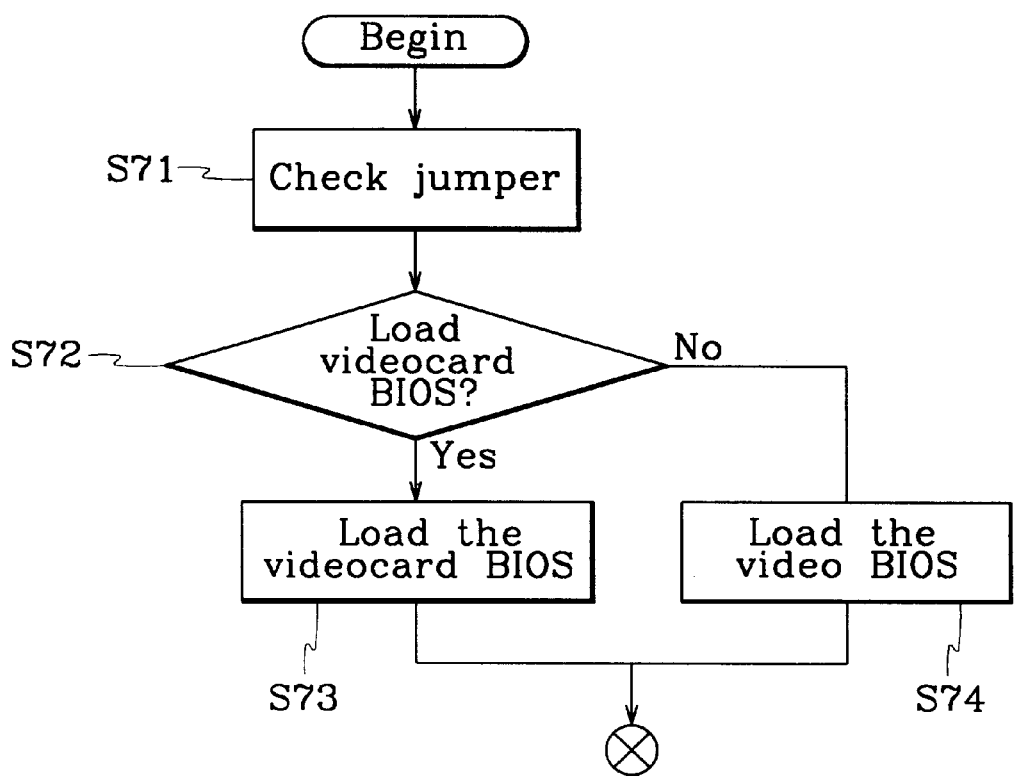
FIG. 7 is a flow chart of an operation of the exemplary video BIOS loading apparatus.

An additional method of operating the video BIOS loading apparatus according to the second embodiment of the present invention is explained below by referring to FIG. 5. The video BIOS loading apparatus according to the second embodiment of the present invention begins operation when a user turns on the power. A system BIOS stored in ROM 220 is read into CPU 200. CPU 200 checks a video BIOS also stored in ROM 220 (S51). CPU 200 then determines whether an option card, e.g., the video card 270, is engaged in expansion slot 260 (S52). If video card 270 is not engaged in expansion slot 260, an error message is output (S56).

If video card 270 is engaged in the expansion slot 260, CPU 200 determines if video card 270 includes a video card BIOS (S53). If the video card BIOS exists, CPU 200 controls a video card controller on video card 270 and loads the video card BIOS to RAM 210 via system bus 240 (S54). If the video card BIOS is not included in video card 270, CPU 200 controls the video card controller in video card 270 and loads the video BIOS stored in ROM 220 to RAM 210 via the system bus 240 (S55).

Although the preferred embodiments of this invention has been described in detail above, those skilled in the art will readily appreciate that certain modifications are possible without departing from the novel teachings and advantages of the invention. Such modifications may include a video BIOS loading apparatus of a computer system according to a third embodiment of the present invention include an engaging means; a video card having a video card controller and a video card BIOS, the video card engaged to the engaging means; and a controller which controls the video card controller and use the video card BIOS for operating the video card. The operation of the third embodiment would be substantially similar to those illustrated above for the first and second embodiments. The third embodiment would differ from the other two embodiments in that it uses only a video card BIOS and does not use a video BIOS stored in the ROM. Therefore, valuable memory space in the ROM is not wasted according to this embodiment. This and additional modifications are intended to be included in this invention as defined by the following claims.

What is claimed is:

1. A method of selecting a VIDEO basic input output system (BIOS) for use in a computer system, said method comprising the steps of:

loading a system BIOS from a first memory to a central processing unit when said computer system is turned on;

checking for a video BIOS in said first memory;

determining whether an expansion card is engaged with an expansion slot of said computer system;

determining whether said expansion card comprises a video card BIOS when it is determined that said expansion card is engaged with an expansion slot;

determining whether said video card BIOS is a product made by a company different from a company which made the video BIOS, when it is determined that said expansion card comprises a video card BIOS;

determining whether said video card BIOS is a more recent version than said video BIOS, when it is determined that said video card BIOS is not a product made by a company different from a company which made the video BIOS;

loading said video BIOS into a second memory, when it is determined that said video card BIOS is not a more recent version than said video BIOS; and loading said video card BIOS into said second memory, when it is determined that said video card BIOS is a more recent version than said video BIOS or when it is determined that said video card BIOS is a product made by a company different from the company which made the video BIOS.

2. The method as set forth in claim 1, further comprising the step of:

loading said video BIOS into said second memory, when it is determined that said video BIOS is in said memory and said expansion card is not engaged with an expansion slot.

3. The method as set forth in claim 1, further comprising the step of:

outputting an error message, when it is determined that said video BIOS is in said memory and said expansion card is not engaged with an expansion slot.

4. A video basic input output system (BIOS) loading apparatus of a computer system, the video BIOS loading apparatus comprising:

a first memory having a video BIOS stored therein;

an engaging means for engaging a video card, the video card having a video card BIOS; and a controller which compares the video BIOS stored in the first memory and the video card BIOS in the video card, and selects for use a more suitable BIOS between the video BIOS and the video card BIOS for the video card.

5. The video BIOS loading apparatus according to claim 4, wherein the controller compares the video BIOS stored in the first memory and the video card BIOS in the video card, and uses a more recent version between the video BIOS and the video card BIOS when they are products of the same company or uses the video card BIOS when the controller determines the video card is a product of a different company.

6. The video BIOS loading apparatus according to claim 4, further comprising a second memory wherein the selected more suitable BIOS is loaded and used by the controller.

7. The video BIOS loading apparatus according to claim 6, further comprising a video controller which controls loading of the more suitable BIOS selected for use by the controller to the second memory.

8. The video BIOS loading apparatus according to claim 6, wherein the video card further comprising a video card controller which controls loading of the more suitable BIOS selected for use by the controller to the second memory.

9. The video BIOS loading apparatus according to claim 6, further comprising:

a video controller which controls loading of the video BIOS to the second memory when the video BIOS is selected for use by the controller.

10. The video BIOS loading apparatus according to claim 6, wherein the video card further comprises a video card controller which controls loading of the video card BIOS to the second memory when the video card BIOS is selected for use by the controller.

11. The video BIOS loading apparatus according to claim 6, wherein the first memory is a read only memory (ROM).

12. The video BIOS loading apparatus according to claim 6, wherein the second memory is a random access memory (RAM).

13. A video basic input output system (BIOS) loading apparatus of a computer system, the video BIOS loading apparatus comprising:

a first memory having a video BIOS stored therein;

an engaging means for engaging a video card; and a controller which uses a video card BIOS if the video card has the video card BIOS and uses the video BIOS stored in the first memory if the video card does not include the video card BIOS.

14. The video BIOS loading apparatus according to claim 13, further comprising a second memory wherein the video BIOS or the video card BIOS is loaded and used by the controller for operating the video card.

15. The video BIOS loading apparatus according to claim 14, wherein the video card further comprising a video card controller which controls loading of the video BIOS or the video card BIOS selected for use by the controller to the second memory.

16. The video BIOS loading apparatus according to claim 14, wherein the first memory is a ROM.

17. The video BIOS loading apparatus according to claim 14, wherein the second memory is a RAM.

18. A video basic input output system (BIOS) loading method of a computer system, comprising the steps of:

determining if a video card is engaged in an engaging means of the computer system;

determining whether a video card BIOS in the video card or a video BIOS stored in a first memory is a more suitable for the video card, if it is determined that the video card is engaged in the engaging means; and using the video card BIOS if it is determined to be more suitable than the video BIOS for the video card, or using the video BIOS if it is determined to be more suitable than the video card BIOS for the video card.

19. The video BIOS loading method according to claim 18, wherein the step of determining whether a video card BIOS in the video card or a video BIOS stored in a first memory is a more suitable for the video card comprises the steps of:

deciding that the video card BIOS is a more suitable for the video card engaged in the computer system if the video card is determined to be a product of the same company and if the video card BIOS in the video card is a newer version than the video BIOS stored in the first memory;

deciding that the video card BIOS is more suitable for the video card engaged in the computer system if the video card is determined to be a product of a different company; and deciding that the video BIOS is more suitable for the video card engaged in the computer system if neither the first deciding step nor the second deciding step applies.

20. The video BIOS loading method according to claim 19, further comprising the steps of:

loading into a second memory the video BIOS stored in the first memory if the video card is determined not to be engaged in the computer system in the first determining step.

* * * * *